US008868643B2

(12) United States Patent  (10) Patent No.: US 8,868,643 B2
Nixon et al. (45) Date of Patent: Oct. 21, 2014

(54) METHODS AND APPARATUS TO COLLECT PROCESS CONTROL DATA

(75) Inventors: Mark Nixon, Round Rock, TX (US); Terry Blevins, Round Rock, TX (US)

(73) Assignee: Fisher-Rosemount Systems, Inc., Round Rock, TX (US)

(*) Notice: Subject to any disclaimer, the term of this patent is extended or adjusted under 35 U.S.C. 154(b) by 530 days.

(21) Appl. No.: 12/878,739

(22) Filed: Sep. 9, 2010

(65) Prior Publication Data

US 2012/0065748 A1    Mar. 15, 2012

(51) Int. Cl.
| G06F 15/16 | (2006.01) |
| G05B 21/02 | (2006.01) |
| G06F 15/173 | (2006.01) |
| G05B 23/00 | (2006.01) |
| G05B 23/02 | (2006.01) |

(52) U.S. Cl.
CPC .............. *G05B 21/02* (2013.01); *G05B 23/00* (2013.01); *G05B 23/02* (2013.01)
USPC ............................. 709/203; 709/223; 709/224

(58) Field of Classification Search
CPC ................................. G05B 23/00; G05B 23/02
See application file for complete search history.

(56) References Cited

U.S. PATENT DOCUMENTS

| 7,496,041 B2 | 2/2009 | Blevins et al. | |
| 7,707,320 B2* | 4/2010 | Singhai et al. | 709/250 |
| 2009/0276486 A1* | 11/2009 | Tandon et al. | 709/203 |
| 2009/0292995 A1 | 11/2009 | Anne et al. | |
| 2010/0083356 A1* | 4/2010 | Steckley et al. | 726/5 |

FOREIGN PATENT DOCUMENTS

GB    2479036    9/2011

OTHER PUBLICATIONS

Blevins et al., "Fieldbus Support for Process Analysis," The Instrumentation, Systems, and Automation Society, vol. 35, Issue 2, 1996, 8 pages.
Blevins et al., "Advanced Functionality and Diagnostics of Fieldbus Devices," presented at ISA Expo 2000, 6 pages.
Fieldbus Foundation, "FOUNDATION™ Specification Function Block Application Process," Fieldbus Specifications, Document No. FF-890 FS 1.8, Jun. 3, 2010, 4 pages.
HART Communication Foundation, "Common Practice Command Specification," HART Communication Foundation Document No. HCF_SPEC_151, Revision 9.0, Sep. 4, 2007, 160 pages.
HART Communication Foundation, "Common Practice Command Specification," HART Communication Foundation Document No. HCF_SPEC_151, Revision 9.2, Jul. 16, 2008, 174 pages.
Intellectual Property Office, "Patents Act 1977: Search Report under Section 17", issued in connection with Great Britain Patent Application No. GB1113797.3, Dec. 12, 2011 (4 pages).

* cited by examiner

*Primary Examiner* — Joseph Greene
(74) *Attorney, Agent, or Firm* — Hanley, Flight & Zimmerman, LLC

(57) ABSTRACT

Methods, apparatus, and articles of manufacture to collect process control data are disclosed. An example method to collect process control data includes registering an electronic device description describing a parameter to be measured and a measurement sampling rate, measuring the parameter based on the measurement sampling rate, storing data representative of the measured parameter in a data structure, and transferring data in the data structure to a first process control device via a process control network in response to at least one of a request for the data, a condition associated with the data, or an event associated with the data.

20 Claims, 8 Drawing Sheets

Method1(FrequencyCapture args, int numberOfElements, double averageValue, double maxValue, double minValue)
{
    maxValue = args[0];
    minvalue = args[0];
    Double total = 0;

for (int i=0; I < numberOfElements)
    {
        if (args[i] > maxValue) maxValue = args[i];
        if (args[i] < minValue) minValue = args[i];
        total += args[i];
    }
    averageValue = total / numberOfElements;
}

METHODS AND APPARATUS TO COLLECT PROCESS CONTROL DATA

FIELD OF THE DISCLOSURE

This disclosure relates generally to process control systems, and, more particularly, to methods and apparatus to collect process control data.

BACKGROUND

Process control systems, like those used in chemical, petroleum, pharmaceutical, pulp and paper, or other manufacturing processes, typically include one or more process controllers communicatively coupled to at least one host including at least one operator workstation and to one or more field devices configured to communicate via analog, digital or combined analog/digital communication protocols. The field devices, which may be, for example, device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A process controller receives signals indicative of process measurements made by the field devices and/or other information pertaining to the field devices, uses this information to implement a control routine, and generates control signals that are sent over buses or other communication lines to the field devices to control the operation of the process.

A typical process control system is segmented into one or more control loops that are operated by a process controller. Each control loop includes a number of inputs from one or more field devices, a control algorithm, and one or more outputs. Each of these field devices is typically coupled to the process controller via one or more I/O cards and a respective communication path (e.g., a two-wire cable, a wireless link, or an optical fiber). The I/O cards receive inputs from the field devices and forward the inputs to the process controller. Likewise, the output signals are transmitted to field devices within the process control system via the I/O cards. The quality of any particular control loop is determined by the ability of the control loop to read an input change in a timely manner, perform necessary control calculations, and generate a response in the form of an output signal. In some cases, a communication path may delay an input signal from being received in a timely manner by a process controller, thereby degrading the quality of any control loop that uses that communication path.

SUMMARY

An example method to collect process control data includes registering an electronic device description describing a parameter to be measured and a measurement sampling rate, measuring the parameter based on the measurement sampling rate, storing data representative of the measured parameter in a data structure, and transferring data in the data structure to a first process control device via a process control network in response to at least one of a request for the data, a condition associated with the data, or an event associated with the data.

An example apparatus to collect process control data includes a sensor to collect information associated with a process control parameter, an analog-to-digital converter to convert the information to measurement data, a storage device to store the measurement data in a data structure, and a port controller to receive requests for data as defined by an electronic device description associated with the apparatus, to open a port for communication with a process control device, and to transfer the measurement data to the process control device as defined by the electronic device description.

DETAILED DESCRIPTION

The example methods and apparatus described herein may be used in a process control system to perform data transfers between devices and applications that collect process control data. As greater numbers of process control functions previously performed using dedicated hardware are performed using software, data latency can have a significant impact on control performance. While some process control communication networks, buses, standards, and/or communication protocols can handle high volume data transfers, other networks, buses, standards, and/or protocols may not provide such capability or capacity. Thus, in a process control system involving multiple networks, busses, standards, and/or protocols, there may be a wide range of data volume capacities and/or data requirements among these networks, busses, standards, and/or protocols. In such process control systems, using multiple communication protocols, the example methods and apparatus described herein can be used to enable access to data having different properties or requirements by reading the properties or requirements from an electronic device description (EDD) file. Additionally, the example methods and apparatus described herein can be used to enable more complex and/or data intensive field devices may be developed and/or used on communication busses having lower data volume capacities.

In some examples described below, a process control device, such as a sensor or other type of process monitor, samples a process control condition or variable according to or as defined by an EDD file to generate a digital representation of a variable value. Sampling of process control conditions often occurs at different rates for different variables, and the samples may be used by a process analyzer as the samples are generated and/or after multiple samples are collected. In some examples, the process control device transmits the samples to a process control application upon sampling according to or as defined by an EDD file. In some other examples, the process control device stores the samples in a data structure and transmits the data structure to a process control application when a sufficient or certain number of samples have been collected.

In some example process control systems, a process control device, a process controller, and/or a process control application that uses sampled data (e.g., in a process control loop) accesses an electronic device description (e.g., an EDD file) of a process monitor or sensor that generates the data samples to determine a method to retrieve the data samples from the process monitor or sensor. After determining the method of retrieving data samples, the process control device, the process controller, and/or the process control application accesses the data samples via a process control communication bus and/or network.

Figure 1:
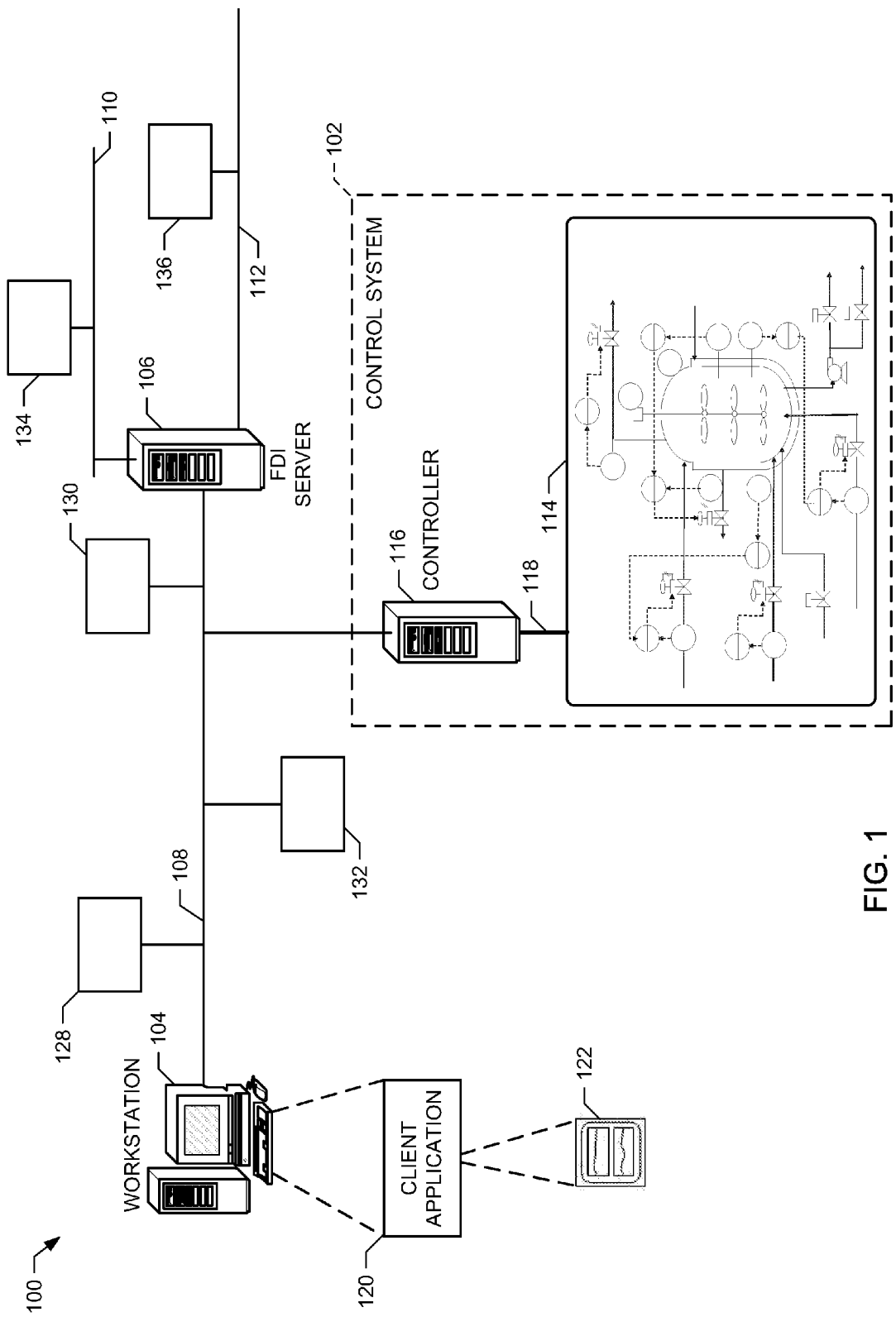
FIG. 1 is a block diagram illustrating an example process control system.

FIG. 1 is a block diagram illustrating an example process control environment 100 including a control system 102, a workstation 104, and a field device integration (FDI) server 106. The example control environment 100 may include additional clients (not shown) that may be communicatively coupled to the control system 102 and/or other control systems (not shown).

The workstation 104 (e.g., a terminal, a workstation, a PC), the example control system 102, and/or the field device integration (FDI) server 106 communicate using an FDI standard. The FDI server 106 interfaces devices on different networks that operate using different standards, including HART, Foundation Fieldbus, and/or Profibus. In general, the FDI standard provides specifications to enable device manufacturers and/or suppliers to build tool sets that can be used by customers to uniformly manage devices, regardless of the standard to which the devices are originally compliant. The FDI standard includes a textual device description method that allows a text-based file (e.g., an XML file) in a standard Electronic Device Description Language (EDDL) to describe a device, methods provided by the device, measurement and device parameters supported by the device, configuration information for the device, and/or interactions that users can have with the device.

The FDI standard further provides a method for applications and/or devices to communicate. The communication method resembles that of a message bus that sends and receives messages via communication channels. The message bus method allows applications, controllers, servers, and/or devices to interact without necessarily knowing all of the specific details about the internal operation of the receiving application or device. In addition to the message bus approach, the FDI standard provides features for a service-oriented method of requesting services from applications, controllers, servers, and/or devices. Under this service-oriented method, applications, controllers, servers, and/or devices expose and consume functionality using contracts and messages. The service method may be used by applications, controllers, servers, and/or devices to negotiate, allocate, deallocate, limit, manage, and diagnose system resources and/or behavior.

The example workstation 104 and the example FDI server 106 are in communication via a first communication bus 108. The FDI server 106 connects or communicatively couples the communication bus 108 to other communication buses 110 and 112, which may be of the same type or of different types than the communication bus 108. The FDI server 106 is also in communication with the control system 102 via the communication bus 108. Thus, the workstation 104 may communicate with any of the devices in the control system 102 via the FDI server 106 and the communication bus 108. In some examples, the communication buses 108-112 may be implemented using the Foundation Fieldbus protocol, the Profibus protocol, and/or the HART protocol.

The HART protocol includes a method to perform block data transfers, which may be used to perform more complex process control functions such as valve diagnostics and/or frequency analyses. The HART block data transfer method allows a host to establish a connection to a particular port of a slave device, through which a stream of data may be transferred to or from the slave device. The type of data or the function of the data may determine which port is opened at the slave device.

Similarly, Foundation Fieldbus specifies a Trend Object, which is a data structure that stores up to 16 parameter samples (e.g., 16 samples for one parameter, 8 samples for each of 2 parameters, etc.) on a process control device. When the Trend Object is filled, the process control device may transmit the Trend Object, including the stored samples, to an interface device (e.g., a controller, a process control application, etc.) to be used, for example, in a process control loop. In particular, an interface device may access multiple samples of a process control variable via a single interaction with the process control device that collects the samples. By configuring the process control device, the process control device may automatically report some or all Trend Objects to the interface device each time a new set of data is collected. Additionally or alternatively, Trend Objects may be read at any time by the interface device by implementing a read service.

The example control system 102 may include any type of manufacturing facility, process facility, automation facility, and/or any other type of process control structure or system. In some examples, the control system 102 may include multiple facilities at different locations. Additionally, although the example control system 102 is associated with a process control subsystem 114, the control system 102 may include additional process control systems.

The example process control subsystem 114 is communicatively coupled to a controller 116 via a data bus 118. The process control subsystem 114 may include any number of field devices (e.g., input and/or output devices). The field devices may include any type of process control component that is capable of receiving inputs, generating outputs, and/or controlling a process. For example, the field devices may include input devices such as, for example, valves, pumps, fans, heaters, coolers, and/or mixers to control a process. Additionally, the field devices may include output devices such as, for example, thermometers, pressure gauges, concentration gauges, fluid level meters, flow meters, and/or vapor sensors to measure portions of a process. The input devices may receive instructions from the controller 116 to execute a specified command and cause a change to the process. Furthermore, the output devices may measure process data, environmental data, and/or input device data and transmit the measured data to the controller 118 as process control information (e.g., process data). This process data may include the values of variables (e.g., measured process variables and/or measured quality variables) corresponding to a measured output from each field device.

In the illustrated example of FIG. 1, the controller 116 may communicate with the field devices within the process control subsystem 114 via the data bus 118. The data bus 118 may be coupled to communication components within the process control subsystem 114. The communication components may include I/O cards to receive data from the field devices and convert the data into a communication medium capable of being received by the example controller 116. Additionally, these I/O cards may convert data from the controller 116 into a data format capable of being processed by the corresponding field devices. In an example, the data bus 118 may be implemented using the Fieldbus protocol or other types of wired and/or wireless communication protocols (e.g., Profibus protocol, HART protocol, etc.).

The controller 116 is communicatively coupled to the FDI server 106 via any wired and/or wireless connection. The controller 116 may transmit process data to the FDI server 106 upon the controller 116 receiving the process data from the process control subsystem 114. In other examples, the controller 106 may transmit process data to the FDI server 106 at periodic time intervals (e.g., every minute, hour, day, etc.). Alternatively, the FDI server 106 may request process data from the controller 116.

Upon receiving the process data, the example FDI server 106 of FIG. 1 stores the process data within a file system (not shown). The file system may be arranged in a hierarchical manner with directories and/or sub-directories based on the devices within the process control subsystem 114 and/or based on a routine (e.g., application and/or algorithm) operating within the controller 116 to manage the process control subsystem 114. In other examples, the file system may be arranged by an operator of the control system 102. The process data may be stored to a parameter within the associated directory and/or sub-directory. In some examples, the parameter may be a variable associated with a routine operating on the controller 116 or associated with a field device output within the process control environment 100. The parameter may include metadata that describes the type of process data associated with the parameter.

The example workstation 104 may be associated with an individual that may be authorized to read, write, and/or subscribe to process data associated with the process control system. The workstation 104 may also be associated with personnel associated with the control system 102 that may access the process control environment 100 from a remote location. The workstation 104 may access the process control environment 100 via the FDI server 106 using any wired and/or wireless communication medium (e.g., the Internet).

The example FDI server 106 is capable of formatting the process data such that the process data is viewable by a user of a client application 120 operating on the workstation 104. The example of FIG. 1 shows the client application 120 displaying process data in an interface 122. For example, the client application 120 may include a web client display application. The FDI server 106 may format process data for a web server application by creating a webpage and/or accessing a template webpage and placing or embedding the data fields within the webpage. The interface 122, via a web browser, may then display the process data by accessing the webpage hosted in the FDI server 106 using html requests and responses. Alternatively, the FDI server 106 may format the process data for a client display application by initializing at the client application 120 a web application (e.g., ActiveX, Adobe Flash™ and/or Silverlight™) that may be executable within a web browser (e.g., the interface 122) or which may be native to the workstation 104 (e.g., a Windows® operating system application, an application plug-in).

The workstation 104, the FDI server 106, and/or the controller 116 may communicate with other devices 128, 130, 132, 134, 136 via the communication buses 108-112. The example devices 128-136 may include workstations, terminals, controllers, communication network drop nodes, communication devices (e.g., modems, network gateways) and/or any other types of input, output, and/or control devices. In some examples, the workstation 104, the FDI server 106, and/or the controller 116 may transfer information to and/or from the devices 128-136 (e.g., for data processing, data logging, and/or other purposes) using synchronous transfers, block data transfers, and/or other methods of communicating data via the data buses 108-112.

Figure 2:
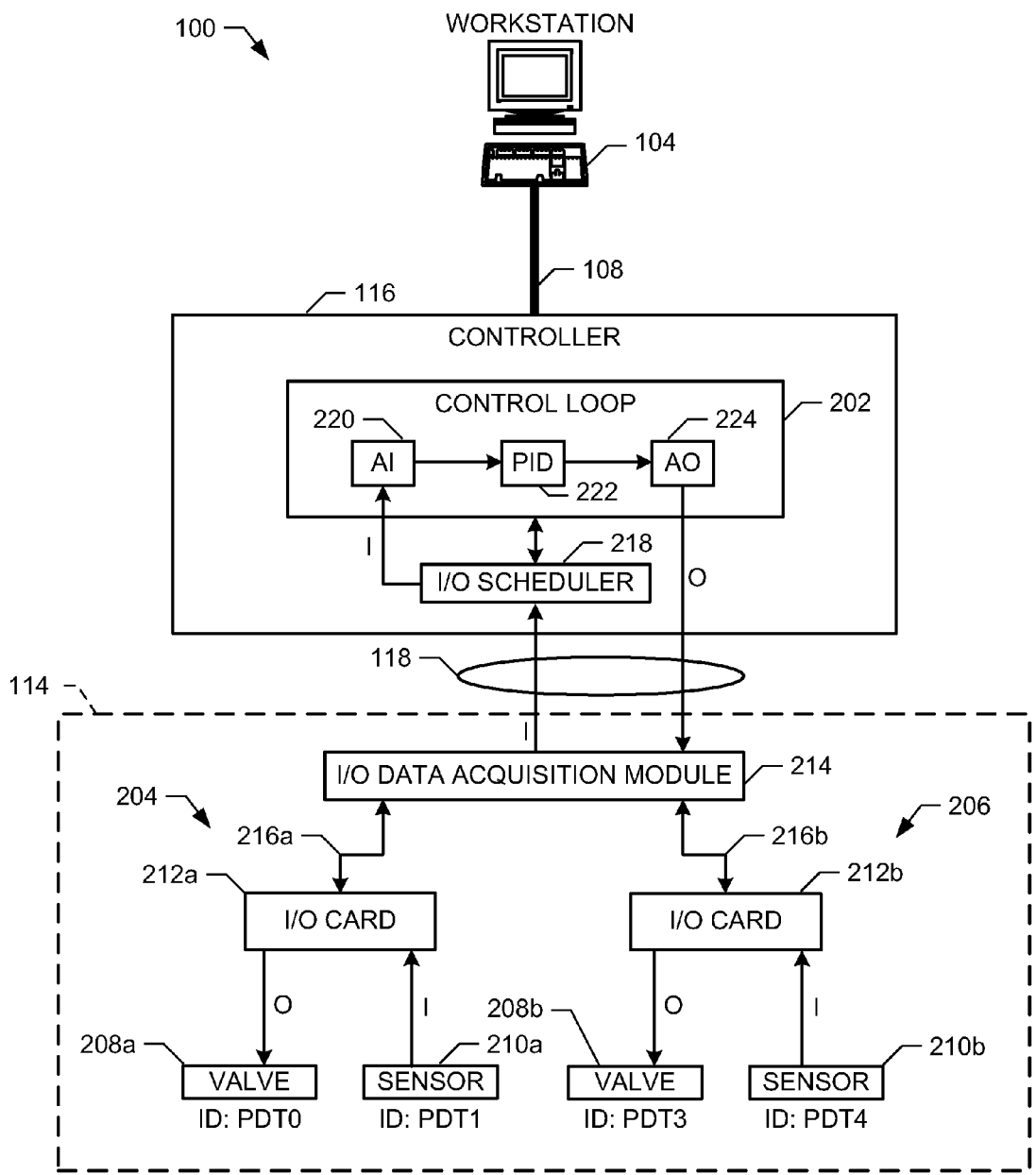
FIG. 2 is a diagram of an example control loop of the process control system of FIG. 1.

FIG. 2 shows the example process control subsystem 114 and the example controller 116 of FIG. 1 operating a control loop 202. FIG. 2 further includes two sets of feedback loops 204 and 206. The first feedback loop 204 includes field devices 208a (e.g., a valve) and 210a (e.g., a pressure sensor), which are coupled to an I/O card 212a. The second feedback loop 206 includes the field devices 208b (e.g., a valve) and 210b (e.g., another pressure sensor), which are coupled to an I/O card 212b.

As illustrated in FIG. 2, the process control environment 100 includes the workstation 104 of FIG. 1, which is communicatively coupled to the controller 116 via one or more communication networks (e.g., the communication bus 108). The controller 116 is also communicatively coupled to an I/O data acquisition module 214 within the process control subsystem 114 (e.g., via the data bus 118 of FIG. 1). The I/O data acquisition module 214 is communicatively coupled to the I/O cards 212a and 212b via respective communication paths 216a and 216b (e.g., point-to-point connections).

The example controller 116 of FIG. 2 includes an I/O scheduler 218. In some examples, the controller 116 may also include the I/O data acquisition module 214, in which case the controller 116 may communicate with the example I/O cards 212a and 212b via the communication bus 108 and/or via the communication paths 216a and 216b. In other examples, the I/O data acquisition module 214 may be implemented within the I/O cards 212a and 212b.

The control loop 202 includes an input signal processor or function block (AI) 220, a proportional-integral-derivative control action calculator or function block (PID) 222, and an output signal generator or function block (AO) 224. The AI 220, the PID 222, and/or the AO 224 may use data generated by the I/O data acquisition module 214 to control a process. To transmit the data via the communication bus 118, the example I/O data acquisition module 214 receives signals from the sensors 210a and 210b and samples the signals to generate data representative of the signals. The I/O data acquisition module 214 may then transmit the data to the controller 116.

The collection and/or sampling rates of the signals from the sensors 210a and 210b may be based on respective EDD files (written in EDDL) that describe the signals generated by the sensors 210a and 210b. For example, if the I/O data acquisition module 214 determines, based on the associated EDD file, that the sensor 210a provides temperature measurements, the I/O data acquisition module 214 may sample the signal received from the sensor 210a at a relatively slow rate. In contrast, if the I/O data acquisition module 214 determines, based on the associated EDD file, that the sensor 210b provides pressure measurements, the I/O data acquisition module 214 may sample the signal received from the sensor 210b at a relatively fast rate. Based on the EDD file and/or the sampling rate, the I/O data acquisition module 214 may then transmit the sample data to the controller 116 at different rates and/or using different transmission methods.

A control algorithm and/or a routine within the control loop 202 receives the input data from the AI 220, processes the input data using the PID 222, and generates output data via the AO 224. A single control loop cycle may include a plurality of routines and/or control algorithms. In other examples the control loop 202 may include other types of AIs, PIDs, and/or AOs. Furthermore, other examples may include multiple AIs 220, PIDs 222, and/or AOs 224.

In some examples, any of the sensors 210a-210b, the I/O cards 212a-212b, the I/O data acquisition module 214, and/or the controller 116 (including the I/O scheduler 218, the AI 220, the PID 222, and/or the AO 224) may communicate digitally. For example, digital communications may carry process control data, such as digital samples of analog sensor data, over a digital communications bus. In these examples, the sensors 210a-210b, the I/O cards 212a-212b, the I/O data acquisition module 214, and/or the controller 116 may store, transmit, and/or receive the digital samples based on, for example, electronic device description files that describe definitions of process control variables, sampling frequenc(ies) of the process control variable(s), and/or standard and/or special methods to access the process control variables. Example process control devices and example process control applications and/or controllers that may be used to implement any of the sensors 210a-210b, the I/O cards 212a-212b, the I/O data acquisition module 214, and/or the controller 116 are described below in conjunction with FIGS. 3 and 4. Additionally, example processes that may be used to transfer data for processing are described in FIGS. 6 and 7.

In an operational example of the process control subsystem 114 and the control loop 202a, the sensor 210a sends an input signal, including the pressure value of the fluid within the pipe, to the I/O card 212a and/or to the I/O data acquisition module 214. In some examples, the sensor 210a may send the input signal upon a request from the I/O data acquisition module 214. The I/O data acquisition module 214 forwards the input signal and/or data representative of the input signal is forwarded and processed via the control loop 202. The control loop 202 then uses the input data to calculate a control action for the valve 208a. The controller 116 transmits this control action via output data, which may be converted to an output signal via the I/O card 212a, to the valve 208a. The valve 208a receives the output data and/or the output signal and changes its position based on the value of the output data and/or signal. In an example of data processing, a pressure signal may be generated by the sensor 210a, sampled at the I/O card 212a and/or the I/O data acquisition module 214 to generate pressure data, and transferred according to an EDD file from the I/O card 212a and/or the I/O data acquisition module 214 to the controller 116 for frequency analysis.

The I/O scheduler 218 and/or the controller 116 manage the timing of the input signals originating from the sensors 210a and 210b. The I/O scheduler 218 forwards the input signals to the control loop 202 during each scheduled time period of the control loop 202. For example, the control loop 202 includes a scheduled time period during which the controller 116 is to receive an input signal originating from the sensor 210a and a scheduled time period during which the controller 116 is to receive an input signal originating from the sensor 210b. These scheduled time periods may be predefined such that the control loop 202 receives each of the input signals from the respective sensors 210a and 210b prior to the control loop 202 utilizing and/or processing each of the input signals. In some examples, the controller 116 (e.g., via the I/O scheduler 218) subscribes to the data generated by the sensors 210a and 210b. The controller 116 may determine the type of data from an EDD file for the sensors 210a and 210b.

The AI 220 receives input data from the I/O scheduler 218 and configures the input data for processing within the PID 222. The I/O scheduler 218 may forward input data to the AI 220 during the scheduled time period for each input signal and/or may collect the input data and forward the input data in bulk using a data structure. In examples when the input data is received by the I/O scheduler 218 before the start of a scheduled time period during which that input data is needed for processing by the control loop 202, the I/O scheduler 218 delays forwarding the input data until the scheduled time period. In other cases, when the I/O scheduler 218 has not received input data by the end of the scheduled time period, the AI 220 may utilize input data previously sent from the same field device. The I/O scheduler 218 and/or the controller 116 may adjust the timing of subsequent input data from the same field device so that the I/O scheduler 218 receives the input data during scheduled time period(s) (i.e., time periods preceding the times at which data are needed for processing by the controller 116 when executing, for example, the control loop 202). In other examples, the I/O scheduler 218 and/or the controller 116 may incrementally adjust the timing of subsequent input data from the same field device to avoid overshoot in the timing of the received input data.

In another operational example, the sensor 210a transmits a pressure input signal every 5 milliseconds (ms). In some examples, the I/O data acquisition module 214 may poll or query the sensor 210a for an input value on a 5 ms repeating cycle. In that case, the sensor 210a generates first pressure data and transmits the first pressure signal to the I/O data acquisition module 214. Five milliseconds later, the sensor 210a generates a second pressure signal and, 5 ms after the second pressure signal, the sensor 210a generates a third pressure signal, etc. The I/O data acquisition module 214 receives the first pressure signal and/or data via the I/O card 212a and forwards the data to the I/O scheduler 218. In some examples, the I/O data acquisition module 214 may transmit the data to the controller 116 (e.g., the I/O scheduler 218) as the I/O data acquisition module 214 receives and/or samples the signal from the sensors 210a and 210b. In some other examples, the I/O data acquisition module 214 may populate a data structure (e.g., a Trend object, an array object) and transfer the data in the data structure to the controller 116 using a bulk data transfer.

Upon receiving the pressure data, the control loop 202 calculates a control action for the valve 208a. For example, the pressure data may indicate a pressure value of 1805 bar. The PID 222 may then compare this value to a defined threshold value of 1700 bar. The 105 bar difference above the threshold may then cause the PID 222 to calculate a control action to open the valve 208a to lower the pressure in the pipe to below 1700 bar. This calculated control action is provided within output data generated by the AO 224 and transmitted to the valve 208a via the I/O card 212a, which may transform the control data back to an analog signal. Upon receiving the output signal, the valve 208a opens to reduce the pressure within the pipe.

Figure 3:
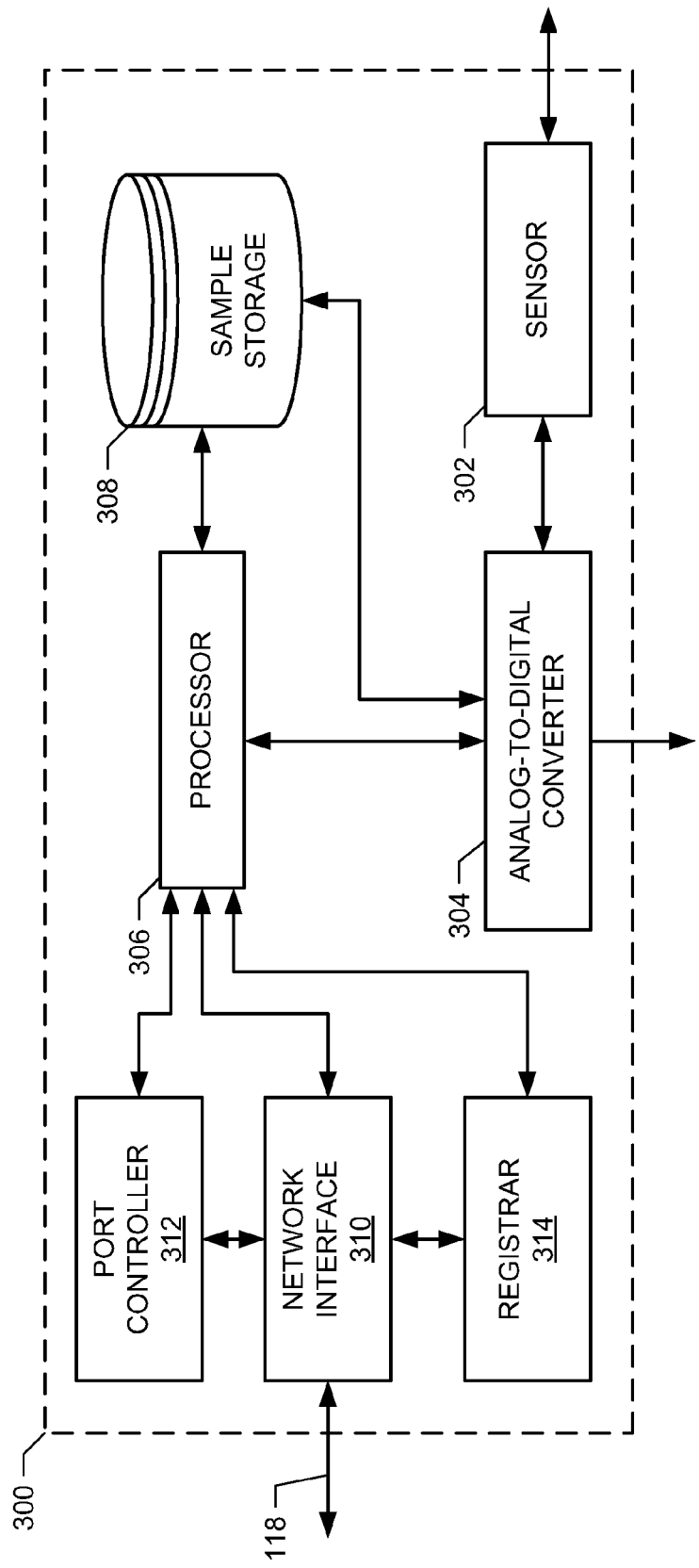
FIG. 3 is a block diagram of an example process control device within the process control system of FIGS. 1 and 2 to provide process control data.

FIG. 3 is a block diagram of an example process control device 300 within the process control environment 100 of FIGS. 1 and 2 to generate, store, and transmit process control data. The example process control device 300 may be used to implement any of the example process control devices 128-136 of FIG. 1 and/or the sensors 210a and 210b of FIG. 2. Additionally or alternatively, the example process control device 300 may implement the controller 116 and/or the I/O cards 212a and 212b of FIG. 2.

The example process control device 300 includes a sensor 302, an analog-to-digital converter (ADC) 304, and a processor 306. The processor 306 generates and/or maintains a sample storage 308, which is described in more detail below. To communicate with a process control application or other process control device, the example process control device 300 includes a network interface 310, a port controller 312, and a registrar 314.

The example sensor 302 measures a process control variable, such as temperature, pressure, and/or other variables. Many process control measurements are continuous conditions which, when measured and converted to an electrical signal by a transducer, result in a continuous analog signal. The analog signal may be acquired, amplified, altered, filtered, and/or transmitted as part of a control loop as described above in conjunction with FIG. 2.

In some other examples in which the measurements are transmitted to other devices along a digital communication network, the ADC 304 converts the analog signal to a digital representation via sampling. In some examples, the process control variable being measured changes relatively slowly (e.g., every 100 ms or more). In these cases, the ADC 304 samples the signal from the sensor 302 at a relatively slow rate. Due to the longer times between sampling the signal, the samples may be transmitted to a controller and/or a process control application via a process control bus (e.g., HART, Fieldbus, Profibus) at the time the ADC 304 generates the sample. To transmit the samples, the ADC 304 provides the sampled values to the processor 306, which transmits the sampled values via the network interface 310. In some examples, the processor 306 determines a reliability value (e.g., a status such as good, bad, or suspect) of the sampled value and transmits the reliability value as a part of the sample. Additionally or alternatively, the processor 306 may add a timestamp to the data to provide for processing of the data.

In other examples, the measured variable changes at a higher rate (e.g., includes higher frequency components). If the higher frequency components are of interest, the ADC 304 samples the variable at a higher rate (e.g., at least twice the frequency of the highest frequency component of interest). As a result of the high-frequency sampling, the samples may not be transmitted via the process control bus when the sample is generated because such transmissions could overwhelm the bandwidth of a communication bus. Instead, the processor 306 creates and populates the sample storage 308 with the sampled values. The example sample storage 308 may further store the reliability of each of the sampled values. An example sample storage 308 that may be used is the Trend Object defined as part of the Foundation Fieldbus standard. When the sample storage 308 has reached a threshold size (e.g., a threshold number of samples), the processor 306 transfers all or a portion of the contents of the sample storage 308 to a controller and/or to a process control application as described in more detail below. In some examples, other conditions (e.g., "TAG/PV">"someLimit") and/or events (e.g., "TAG/Highlimit"="True") may trigger the transmission of data from the sample storage 308.

The sample storage 308 may organize the sample data using, for example, arrays, matrices, classes, structures, and/or any other type of appropriate data structure for the data being stored and/or for the communication protocol(s) used to transmit the sample data. Using an array, the sample storage 308 may store simple types of data types such as floating point numbers (e.g., floats) and/or integers (e.g., ints), as well as more complex data types such as Struct objects. Struct objects may store, for example, values, statuses, quality information, time stamps, and/or other information about the data samples). Using a matrix may be similar to an array, but may be used advantageously to store samples that are correlated and should be stored simultaneously in a common data structure. Storing the data samples as a class or Struct allows the data and/or properties of the data to be extended, modified, and/or otherwise manipulated in ways that arrays and matrices cannot.

The network interface 310 includes the appropriate interface procedures to interact with a process control communication bus, such as HART, Foundation Fieldbus, and/or Profibus procedures. The example communication bus illustrated in FIG. 3 is the communication bus 118 of FIG. 1. The network interface 310 interacts with the processor 306 to transmit messages to and/or from the communication bus 118 and/or with the port controller 312 to manage ports opened for communication with other devices. For example, the port controller 312 may receive a request from a process control application (e.g., the application 120 of FIG. 1) via the network interface 310 for the sample data in the sample structure 308 via a block data transfer on a designated port. If the port controller 312 determines that the request is authorized, the port controller 312 opens the port and notifies the processor 306 of the port through which the sample data is to be transmitted to the requesting application. On the other hand, if the port controller 312 determines that the request is unauthorized, the port controller 312 discards the request and/or instructs the processor 306 to discard the request.

The registrar 314 registers the example process control device 300 with the process control environment 100. Registration may occur, for example, the first time the process control device 300 is connected to the process control environment 100. In some examples, registration may occur each time the process control device 300 is connected and/or reconnected to the process control environment 100 and/or when the process control device 300 has a configuration change (e.g., the physical location of the process control device 300 changes). To register the process control device 300, the example registrar 314 provides an EDD file which, in this example, is written using EDDL.

EDD files may be used to access diagnostic, real-time, and asset management information contained in different field instruments from different manufacturers. EDDL may be used to provide an interoperable environment where information available in modern automation sensors and actuators may be accessed by, for example, distributed process control systems or handheld communicators, to configure, calibrate a process control device, diagnose problems, and/or provide data and/or alarms for user-interface displays.

EDDL is a text-based language that may be used to describe the characteristics of field devices. Device manufacturers may use EDDL to create EDD files to provide a consistent form and structure for host systems and handheld communicators to access and display information in field instruments independent of the communication protocol or device operating system. The EDD file is created by an instrument or device designer and uses EDDL syntax to describe a device and its parameters. The parameters may include, for example, process variables, setpoint, high-low limits, ambient temperature, etc. Device designers may further define interface components, such as menus, parameter displays, display conditions, etc., using EDDL.

Figure 4:
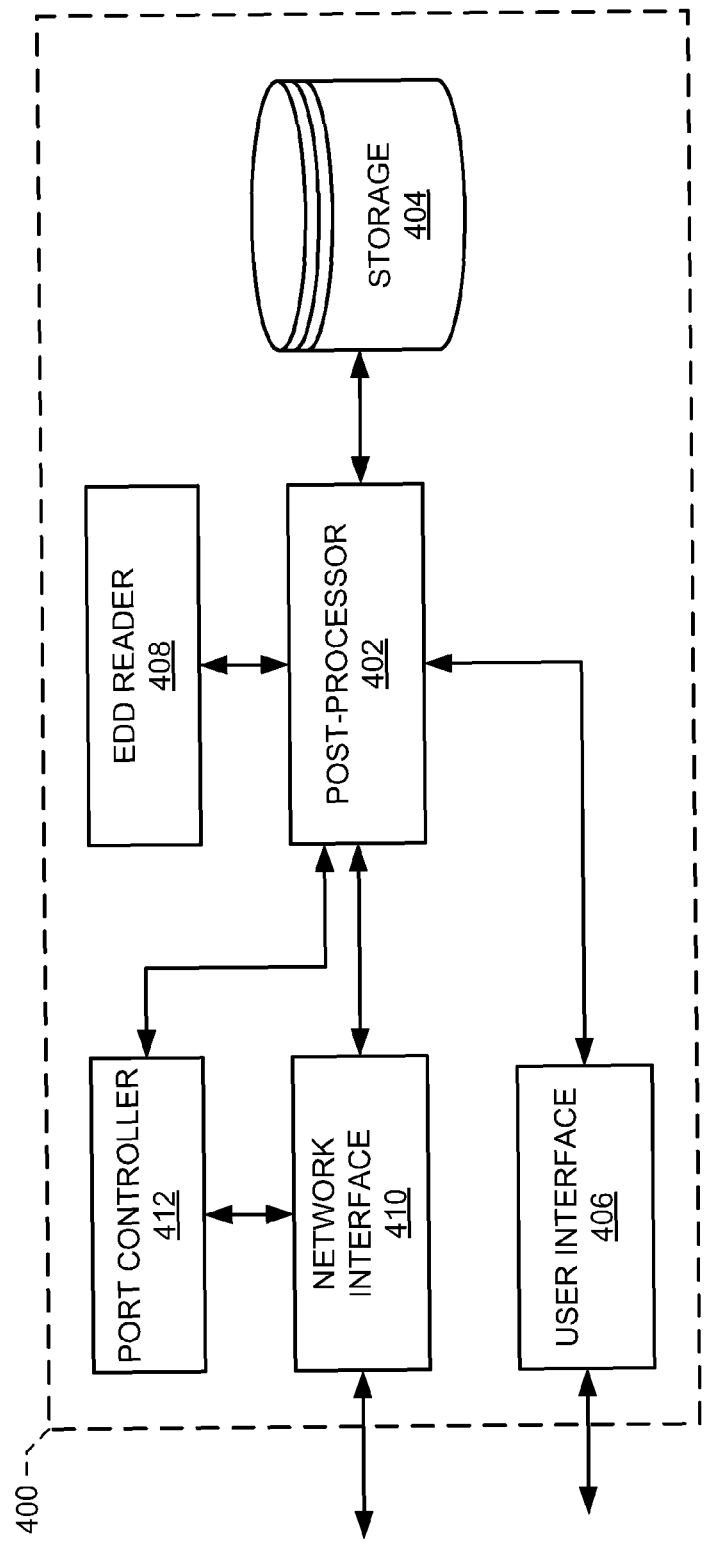
FIG. 4 is a block diagram of an example process control application or controller within the process control system of FIGS. 1 and 2 to receive and/or manipulate process control data.

FIG. 4 is a block diagram of an example process control application 400 or controller within the process control environment 100 of FIGS. 1 and 2 to receive and/or manipulate process control data. For clarity and brevity, the example block diagram of FIG. 4 will be described with reference to a process control application executed on a client device such as the client 120 of FIG. 1. However, the example process control application 400 of FIG. 4 may also be used to implement a process control server, a stand-alone post-processing application, a process controller, or any other types of process control device that may perform control and/or post-processing functions in the context of a process control system.

The example process control application 400 includes a post-processor 402, storage 404, a user interface 406, an EDD file reader 408, a network interface 410, and a port controller 412. The example post-processor 402 receives process control data (e.g., trend data of temperature, pressure, etc.) and performs one or more post-processing operations on the data. For example, post-processing may include frequency analysis, diagnostics, data logging, gauge systems, and/or any other post-processing and/or control application.

Some post-processing applications (e.g., the post-processor 402) may require relatively large amounts of data. To obtain process control data via a process control communication bus (e.g., the communication bus 108), the post-processor 402 may request the data from a source of the process control data (e.g., a sensor, a controller) and/or may receive the data as the source of the data transmits the data via the communication bus 108.

The storage 404 stores process control data prior to post-processing and/or stores the results generated by the post-processor 402. For example, as the process control application 400 receives the process control data from the source(s), the process control data is stored in the storage 404 until enough data has been collected for the post-processor 402 to perform the desired post-processing operation. Additionally or alternatively, after the post-processor 402 has performed the post-processing operation and has generated a result (e.g., a frequency spectrum, a data log, etc.), the result may be stored in the storage 404. From the storage 404, the result may be transmitted to another process control device and/or application, viewed by a user of the process control environment 100 on request, and/or further processed in conjunction with other data.

The post-processor 402 interacts with the user interface 406 to present the results of post-processing operations to a user and/or to receive requests for post-processing data. For example, if a user wants to view a frequency analysis of the pressure at a particular valve, the user may select the valve and instruct the example process control application 400 to perform a frequency analysis via the user interface 406 (e.g., via a computer keyboard and/or computer mouse). After performing the frequency analysis, including retrieving the data from a pressure sensor associated with the selected valve, the post-processor 400 displays the frequency analysis to the user via the user interface 406 (e.g., via a display monitor).

The example network interface 410 may be similar or identical to the network interface 310 of FIG. 3. However, the network interface 410 may be a host interface, as opposed to a slave interface, depending on the type of the communication bus (e.g., Fieldbus). To retrieve data from process control devices, the post-processor 402 accesses the EDD file(s) for the selected device(s) (e.g., a controller for the valve selected by the user) via the network interface 410. The EDD reader 408 reads the EDD file(s) to determine how to access the process control data from the selected device(s). For example, the EDD file(s) may include definitions of the process control variables as used by the process control device, the sampling frequenc(ies) of the process control variable(s), standard and/or special methods to access the process control variables, etc.

Based on the EDD file, the post-processor 402 instructs the port controller 412 to establish a connection to a specific port on the slave device (e.g., the process control device 300 of FIG. 3) using a corresponding port on the process control application 400. The port controller 412 determines the port to be used on the process control application to communicate with the port on the process control device 300 and transmits a command to the process control device 300 via the network interface 410. When the process control device 300 responds to the command, a pipeline is created between the designated ports on the communication bus 108. After receiving a confirmation that a pipeline has been created between the ports, the post-processor 402 requests the desired data collected at the process control device 300 and receives the data via the pipeline.

The transmission of data between the process control device 300 and the process control application 400 may be accomplished via a block data transfer using, for example, a Trend Object (e.g., using Fieldbus) and/or data streaming. In some process control communication protocols (e.g., HART, Fieldbus), a pre-defined or minimum amount of bus time is set aside for synchronous communications, which is generally used by latency-sensitive applications. The remainder of the bus time may be used for other asynchronous communications such as block data transfers. The block data transfer results in a transmission of multiple samples of data from the process control device 300 to the process control application 400. The data samples may additionally include an indication of the reliability of those samples (e.g., a status, good, suspect, bad).

Figure 5:
FIG. 5 illustrates example pseudocode representative of instructions that may be executed to access process control data stored on a process control device.

In some examples, the process control application 400 may access the process control data in the process control device 300 by referencing array or matrix parameters and/or class or struct properties. For example, to access a device array parameter, a process control application may execute the instructions 500 shown in FIG. 5. The example instructions 500 of FIG. 5 illustrate a method that may be used by a process control application (e.g., the process control application 400 of FIG. 4) to access process control data stored on a process control device (e.g., the device 300 of FIG. 3). The process control application 400 determines (e.g., via the EDD reader 408) that the desired data on the process control device 300 is stored as a FrequencyCapture object (e.g., an array) named "args." Thus, as the process control application 400 executes the instructions 500, the process control application 400 obtains the process control data in args via a block data transfer. In some examples, the process control data is transferred prior to beginning the example instructions 500 (e.g., prior to a call of the method).

While an example manner of implementing the example controller 116, the example client application 120, the example process control devices 128-136, and/or the example I/O cards 212a-212b of FIGS. 1 and 2 has been illustrated in FIGS. 3 and 4, one or more of the elements, processes and/or devices illustrated in FIGS. 3 and 4 may be combined, divided, re-arranged, omitted, eliminated and/or implemented in any other way. Further, the example sensor 302, the example ADC 304, the example processor 306, the example sample storage 308, the example network interface 310, the example port controller 312, the example registrar 314, the example post-processor 402, the example storage 404, the example user interface 406, the example EDD reader 408, the example network interface 410, the example port controller 412, and/or, more generally, the example process control device 300 and/or the example process control application 400 of FIGS. 3 and 4 may be implemented by hardware, software, firmware and/or any combination of hardware, software and/or firmware. Thus, for example, any of the example sensor 302, the example ADC 304, the example processor 306, the example sample storage 308, the example network interface 310, the example port controller 312, the example registrar 314, the example post-processor 402, the example storage 404, the example user interface 406, the example EDD reader 408, the example network interface 410, the example port controller 412, and/or, more generally, the example process control device 300 and/or the example process control application 400 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example sensor 302, the example ADC 304, the example processor 306, the example sample storage 308, the example network interface 310, the example port controller 312, the example registrar 314, the example post-processor 402, the example storage 404, the example user interface 406, the example EDD reader 408, the example network interface 410, and/or the example port controller 412 are hereby expressly defined to include a computer readable medium such as a memory, DVD, CD, etc. storing the software and/or firmware. Further still, the example process control device 300 and/or the example process control application 400 of FIGS. 3 and 4 may include one or more elements, processes and/or devices in addition to, or instead of, those illustrated in FIGS. 3 and 4, and/or may include more than one of any or all of the illustrated elements, processes and devices.

Figure 6:
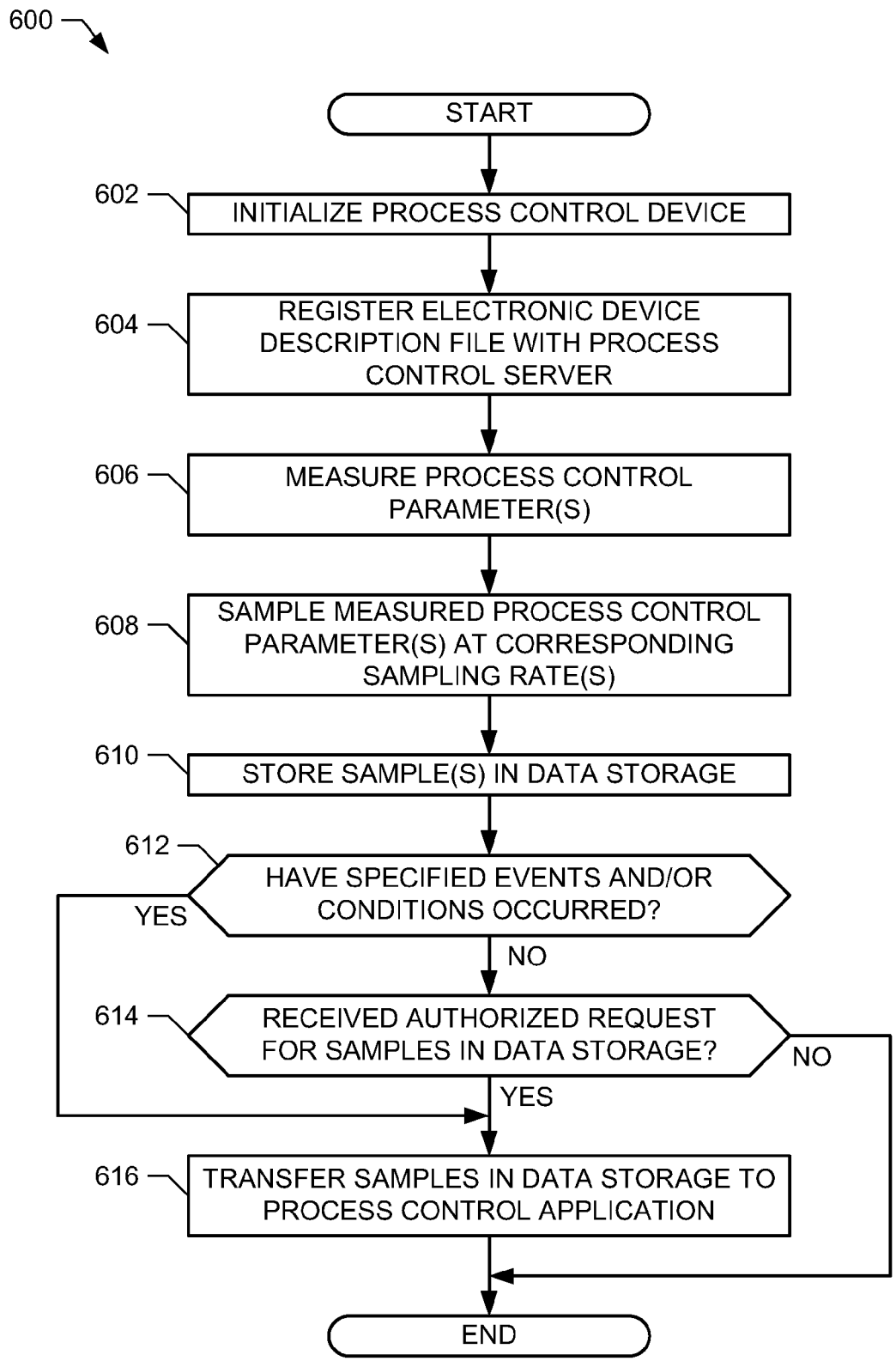
FIG. 6 is a flowchart representative of an example method that may be performed to collect process control data samples.
Figure 7:
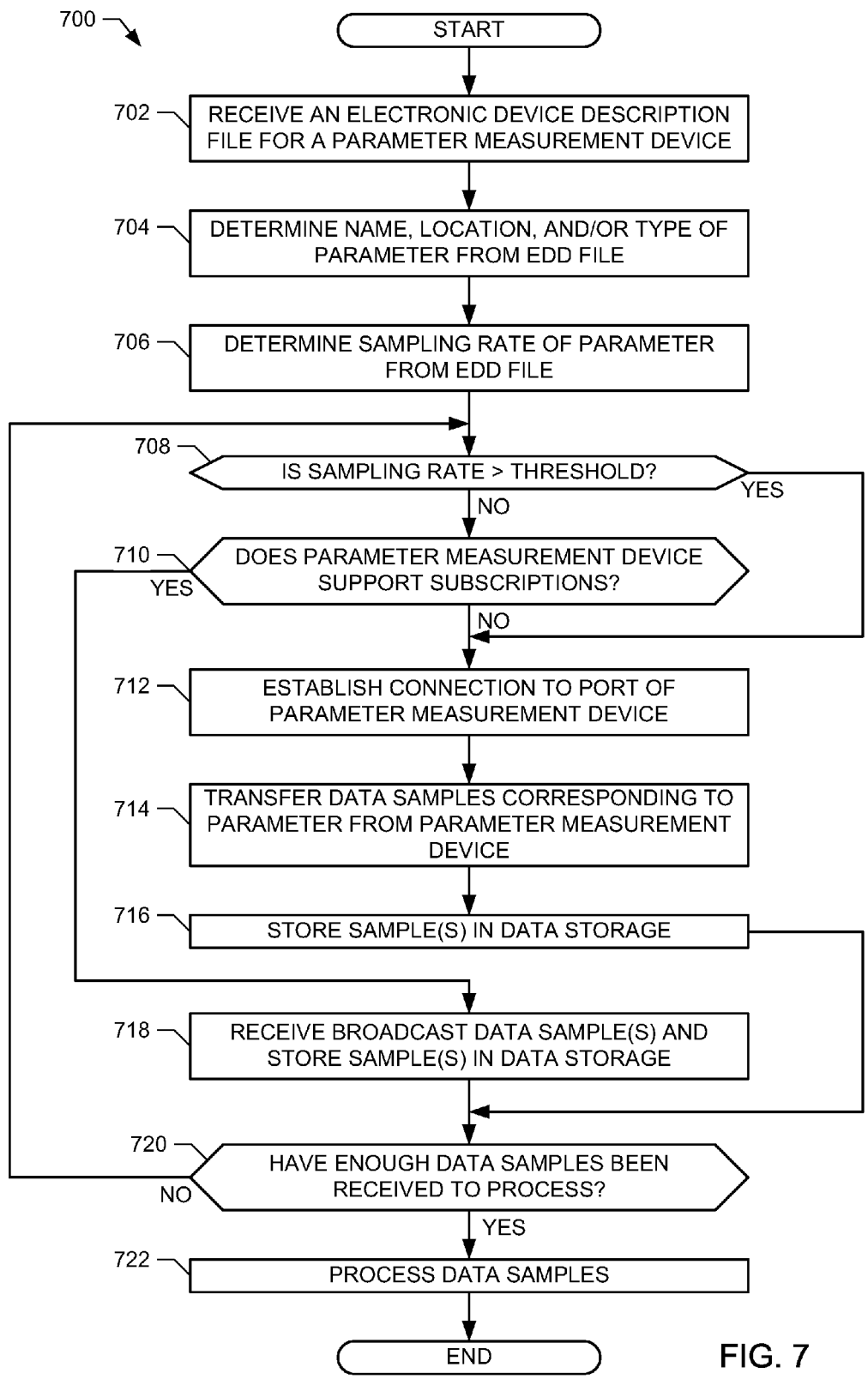
FIG. 7 is a flowchart representative of an example method that may be performed to process data samples.

Flowcharts representative of example processes or methods for implementing the example controller 116, the example client application 120, the example process control devices 128-136, and/or the example I/O cards 212a-212b of FIGS. 1 and 2 are shown in FIGS. 6 and 7. In this example, the methods may be implemented using a program for execution by a processor such as the processor 802 shown in the example computer 800 discussed below in connection with FIG. 8. The program may be embodied in software stored on a computer readable medium such as a CD-ROM, a floppy disk, a hard drive, a digital versatile disk (DVD), or a memory associated with the processor 802, but the entire program and/or parts thereof could alternatively be executed by a device other than the processor 802 and/or embodied in firmware or dedicated hardware. Further, although the example program is described with reference to the flowcharts illustrated in FIGS. 6 and 7, many other methods of implementing the example controller 116, the example client application 120, the example process control devices 128-136, and/or the example I/O cards 212a-212b of FIGS. 1 and 2 may alternatively be used. For example, the order of execution of the blocks may be changed, and/or some of the blocks described may be changed, eliminated, or combined.

As mentioned above, the example methods or processes of FIGS. 6 and 7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6 and 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 6 is a flowchart representative of an example method 600 that may be performed to collect process control data samples. The example method 600 may be used to implement the process control devices 128-136 of FIG. 1, the sensors 210a-210b and/or the I/O cards 212a-212b of FIG. 2, and/or the example process control device 300 of FIG. 3. For clarity and brevity, the example method 600 will be described below in conjunction with the example process control device 300 of FIG. 3.

The example method 600 begins with the example processor 306 initializing the process control device 300 (block 602). The initialization may occur when, for example, the process control device 300 is connected to the process control environment 100 of FIG. 1 and powered on. After or as a part of the initialization, the registrar 314 registers an EDD file with a process control server (e.g., the FDI server 106 of FIG. 1) (block 604). The EDD file may include, for example, the services provided by the process control device 300, parameters measured by the process control device 300, sampling rates of the parameters, and/or other descriptions of the process control device 300.

The sensor 302 may then measure one or more process control parameters (e.g., temperature, pressure, etc.) (block 606). In some examples, the sensor 302 measures substantially continuous values of the parameter and outputs an analog signal. The ADC 304 samples the measured process control parameters (e.g., samples the analog signal from the sensor 302) at sampling rate(s) corresponding to the process control parameters (e.g., based on the type of parameter), thereby generating data samples (block 608). The ADC 304 and/or the processor 306 stores the samples in data storage (block 610). For example, the ADC 304 may provide the samples to the sample storage 308, which stores the samples into a corresponding data structure. Some example data structures that may be used include array objects, matrix objects, classes, structs, and/or other types of data structures.

The processor 306 determines whether one or more specified events and/or conditions have occurred (e.g., as defined in the EDD) to trigger a transmission of data from the sample storage 308 (block 612). For example, the processor 306 may determine whether the number of samples in the sample storage 308 exceeds a threshold (e.g., "TAG/PV">"someLimit," a condition) and/or may determine whether a designated alarm has been flagged (e.g., "TAG/Highlimit"="True," an event). In some examples, the threshold may represent when a data structure has reached its capacity for data samples, timestamps, and/or statuses. In other examples, the threshold may represent a lower data size limit to efficiently transfer the data samples to another process control device and/or application via a block data transfer or by streaming data. If the one or more specified events and/or conditions have not occurred (block 612), the processor 306 determines whether an authorized request for the samples in the data storage has been received (block 614). The processor 306 may determine whether a request is authorized by, for example, comparing the requester's credentials to an access list. However, many methods to determine authorization may be used to determine whether a request for samples is authorized.

If the request is not authorized (block 614), the example method 600 may end. Alternatively, the example method 600 may iterate to continue collecting samples, storing the samples, receiving requests for data, and/or transmitting data samples from the data storage. On the other hand, if the one or more specified events and/or conditions have occurred (block 612) or if an authorized request for samples has been received (block 614), the example processor 306 transmits the data samples to a process control application (e.g., via the network interface 310) (block 616). For example, the port controller 312 may open a port for transfer to a particular port on the receiving process control application, and/or the processor 306 broadcasts the data via the network interface 310 when the data structure has reached a threshold size.

FIG. 7 is a flowchart representative of an example method 700 that may be performed to process data samples. The example method 700 may be used to implement the example FDI server 106 and/or the example controller 116 of FIG. 1, and/or the example process control application 400 of FIG. 4. For clarity and brevity, the example method 700 will be described below in conjunction with the example process control application 400 of FIG. 4.

The example process control application 400 receives an EDD file corresponding to a parameter measurement device (e.g., the process control device 300) (block 702). Based on the EDD file, the EDD reader 408 determines a name, location, and/or type of a parameter that is measured by the process control device 300 associated with the EDD file (block 704). The EDD reader 408 further determines the sampling rate of the parameters from the EDD file (block 706).

The EDD reader 408 further determines whether the sampling rate is greater than a threshold (block 708). The example threshold may be representative of a sampling rate at which broadcasting data samples as they are generated becomes impractical. If the sampling rate is not greater than the threshold (block 708), the post-processor 402 may determine if the process control device 300 that generates the desired parameter supports subscriptions (e.g., transmitting or receiving data at periodic and/or aperiodic intervals) to the parameter(s) (block 710). If the example process control device 300 supports subscriptions (block 710), control transfers to block 718, which is discussed in more detail below.

If the EDD reader 408 determines that the sampling rate is greater than the threshold (block 708), or if the process control device 300 does not support subscriptions (block 710) the port controller 412 begins a block data transfer by establishing a connection (e.g., via the network interface 410) to a port on the process control device 300 (e.g., via the network interface 310 and the port controller 312) (block 712). For example, the port controller 412 may cause the network interface 410 to send an open port command, which is then accepted or rejected by the process control device 300. A connection between the ports of the process control device 300 and the process control application 400 is established if the process control device 300 accepts the open port command (e.g., if the process control application 400 is authorized to access the requested parameter).

After establishing the connection, the post-processor 402 conducts a transfer of data samples corresponding to the parameter from the process control device 300 (block 714). In some examples, the process control device transmits a Trend Object containing data samples that include sample values, statuses, and/or timestamps. However, other forms of block data transfer may also be used. The post-processor 402 stores the received data samples in the storage 404 (block 716).

If the sampling rate is not greater than the threshold (block 708) and the process control device 300 supports subscriptions (block 710), the post-processor 402 receives broadcast data samples from the process control device 300 and stores the data samples in the storage 404 (block 718). After receiving and/or storing requested data samples (block 714) and/or broadcast data samples (block 718), the example post-processor 402 determines whether enough data samples have been received and/or stored to process the data samples (block 720). If the post-processor 402 and/or the storage 404 do not have sufficient data samples (block 720), control returns to block 708 to continue collecting data samples.

If there are sufficient data samples (block 720), the post-processor 402 processes the data samples in accordance with the desired analysis or post-processing operation (block 722). For example, the post-processor 402 may conduct any appropriate process control analysis, such as frequency analysis, diagnostics, data logging, gauge systems, and/or any other post-processing and/or control application. In some other examples, the post-processor 402 may conduct control loop operations to generate one or more input values to a process control device. After conducting the processing and/or storing and/or outputting any generated values, the example method 700 may end and/or may iterate to collect and/or process additional process control data.

Figure 8:
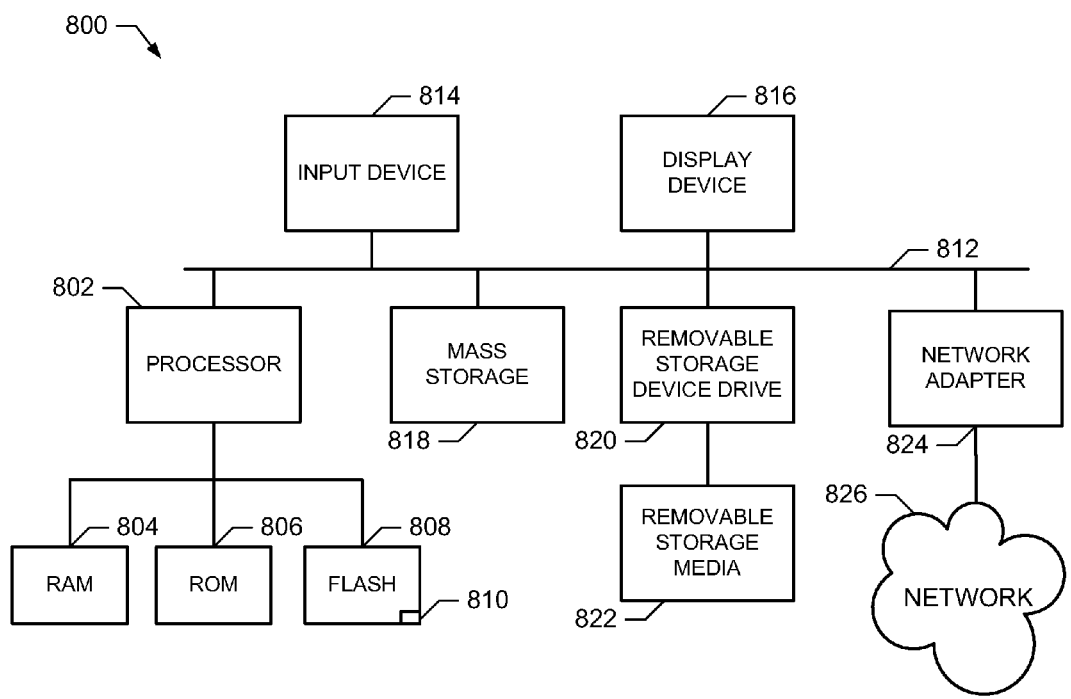
FIG. 8 is a block diagram of an example computer capable of executing the methods of FIGS. 6 and 7 to implement the FDI server, the controller, and/or the process control devices of FIG. 1, the sensors and/or the I/O cards of FIG. 2, the process control device of FIG. 3, and/or the example process control application of FIG. 4.

FIG. 8 is a block diagram of an example computer 800 capable of executing the methods 600 and 700 of FIGS. 6 and 7 to implement the FDI server 106, the controller 116, and/or the process control devices 128-136 of FIG. 1, the sensors 210a-210b and/or the I/O cards 212a-212b of FIG. 2, the process control device 300 of FIG. 3, and/or the example process control application 400 of FIG. 4. The example computer 800 may additionally or alternatively be used to implement the client 104 of FIG. 1 to execute the client application 120. The computer 800 can be, for example, a server, a personal computer, a mobile phone (e.g., a cell phone), a personal digital assistant (PDA), an Internet appliance, or any other type of computing device.

The example processor system 800 includes a processor 802 having associated memories, such as a random access memory (RAM) 804, a read only memory (ROM) 806 and a flash memory 808. For example, the processor 802 can be implemented by one or more Intel® microprocessors from the Pentium® family, the Itanium® family or the XScale® family. Of course, other processors from other families are also appropriate.

The RAM 804, the ROM 806, and/or the flash memory 808 may store machine-readable instructions that implement the processes 600 and 700 of FIGS. 6 and 7. The RAM 804 may be implemented by Synchronous Dynamic Random Access Memory (SDRAM), Dynamic Random Access Memory (DRAM), RAMBUS Dynamic Random Access Memory (RDRAM) and/or any other type of random access memory device. The flash memory 808 of the illustrated example includes a boot block 810. Access to the RAM 804, the ROM 806, and the flash memory 808 is typically controlled by a memory controller (not shown).

The processor 802 is coupled to an interface, such as a bus 812 to which other components may be interfaced. In the illustrated example, the components interfaced to the bus 812 include an input device 814, a display device 816, a mass storage device 818 and a removable storage device drive 820. The removable storage device drive 820 may include associated removable storage media 822 such as magnetic or optical media.

The input device(s) 814 permit a user to enter data and commands into the processor 802. The input device 814 may be implemented using any one or more of a keyboard, a mouse, a touch screen, a track pad, a barcode scanner or any other device that enables a user to provide information to the processor 802.

The display device 816 may be, for example, a liquid crystal display (LCD) monitor, a cathode ray tube (CRT) monitor or any other suitable device that acts as an interface between the processor 802 and a user. The display device 816 as pictured in FIG. 8 includes any additional hardware required to interface a display screen to the processor 802.

The mass storage device 818 may be, for example, a conventional hard drive or any other magnetic or optical media that is readable by the processor 802.

The removable storage device drive 820 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 822 is complimentary to the removable storage device drive 820, inasmuch as the media 822 is selected to operate with the drive 820. For example, if the removable storage device drive 820 is an optical drive, the removable storage media 822 may be a CD-R disk, a CD-RW disk, a DVD disk or any other suitable optical disk. On the other hand, if the removable storage device drive 820 is a magnetic media device, the removable storage media 822 may be, for example, a diskette or any other suitable magnetic storage media.

Coded instructions to implement the processes 600 and 700 of FIGS. 6 and 7 may be stored in the RAM 804, in the ROM 806, in the flash memory 808, in the mass storage device 818, and/or on the removable storage media 822 such as a CD or DVD.

From the foregoing, it will be appreciated that the above disclosed methods and apparatus may be used to provide a mechanism to handle the transfer of large blocks of process control data between devices, controllers, and/or applications using methods defined by electronic device descriptions of the devices, controllers, and/or applications. The example methods and apparatus may further enable storing logs of process activities (e.g., data logging) for later retrieval and/or viewing, recording process errors for faster diagnosis of process problems, streaming measurement data via a process control communications network to profile device performance, and/or integration of previously-dedicated and/or data-intensive functions such as frequency analysis of process control data in other parts of the process control system. Integration of such functions may allow for faster and easier diagnosis of issues. Additionally, the example methods and apparatus enable these and other applications of process control data without requiring substantial additions to infrastructure or sacrificing flexibility or performance of the process control communication devices, controllers, applications, and/or networks.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to collect process control data, comprising:
   determining, from an electronic device description for a process control device, a measurement sampling rate for a parameter to be measured;
   comparing the measurement sampling rate to a threshold;
   measuring the parameter at the measurement sampling rate; and
   when the measurement sampling rate traverses the threshold:
   storing data representative of the measured parameter in a data structure; and
   transferring data from the data structure using a bulk data transfer comprising a plurality of samples of the parameter to a process control device via a process control network when the data structure has an amount of data exceeding a threshold amount; or
   when the measurement sampling rate does not traverse the threshold, transferring the data from the data structure to the process control device as the measurements are received.

2. A method as defined in claim 1, wherein the electronic device description is a file written in Electronic Device Description Language.

3. A method as defined in claim 1, wherein transferring the data comprises establishing a connection between a first port and a second port at the process control device.

4. A method as defined in claim 1, wherein storing the data comprises storing the data in at least one of an array object, a matrix object, a class object, or a struct object.

5. A method as defined in claim 1, wherein the electronic device description includes at least one of a name of the parameter, a location of the parameter, a type of the parameter, or the measurement sampling rate of the parameter.

6. An apparatus to collect process control data, comprising:
   a sensor to collect information associated with a process control parameter at a sampling rate of the sensor;
   an electronic device description reader to determine the sampling rate of the sensor from an electronic device description associated with the sensor and to compare the sampling rate to a threshold;
   an analog-to-digital converter to convert the information to measurement data;
   a storage device to store the measurement data in a data structure at the sampling rate of the sensor; and
   a port controller to receive requests for data as defined by an electronic device description associated with the apparatus, to open a port for communication with a process control device and:
   when the sampling rate traverse the threshold, to transfer the measurement data using a bulk data transfer comprising a plurality of samples of the parameter to the process control device as defined by the electronic device description when the data structure has an amount of the measurement data exceeding a threshold amount; or
   when the sampling rate does not traverse the threshold, to transfer the data from the data structure to the process control device as the measurement are received.

7. An apparatus as defined in claim 6, further comprising a registrar to register the electronic device description with a process control server.

8. An apparatus as defined in claim 6, wherein the electronic device description includes at least one of a name of the parameter, a location of the parameter, a type of the parameter, or the sampling rate of the parameter.

9. An apparatus as defined in claim 6, wherein the data structure comprises at least one of an array object, a matrix object, a class object, or a struct object.

10. An apparatus as defined in claim 6, further comprising a network interface to receive a command to open a port for transferring the data.

11. An apparatus as defined in claim 6, further comprising a processor to determine a status of the data and to store the status in the storage device.

12. A tangible computer readable storage medium comprising machine readable instructions which, when executed, cause a machine to at least:
  determine, from an electronic device description for a process control device, a measurement sampling rate for a parameter to be measured;
  compare the measurement sampling rate to a threshold;
  measure the parameter at the measurement sampling rate; and
  when the measurement sampling rate traverses the threshold:
    store data representative of the measured parameter in a data structure at the measurement sampling rate; and
    transfer data from the data structure using a bulk data transfer comprising a plurality of samples of the parameter to a process control device via a process control network when the data structure has an amount of data exceeding a threshold amount; or
  when the measurement sampling rate does not traverse the threshold, transfer the data from the data structure to the process control device as the measurements are received.

13. A storage medium as defined in claim 12, wherein transferring the data comprises establishing a connection between a first port and a second port at the process control device.

14. A storage medium as defined in claim 12, wherein the electronic device description includes at least one of a name of the parameter, a location of the parameter, a type of the parameter, or the measurement sampling rate of the parameter.

15. A storage medium as defined in claim 12, wherein storing the data comprises storing the data in at least one of an array object, a matrix object, a class object, or a struct object.

16. A method as defined in claim 1, wherein the data structure comprises a trend object to store up to a first number of measurement samples.

17. An apparatus as defined in claim 6, wherein the data structure comprises a trend object to store up to a first number of samples of the measurement data.

18. A storage medium as defined in claim 12, wherein the data structure comprises a trend object to store up to a first number of measurement samples.

19. A method as defined in claim 1, wherein the bulk data transfer comprises a transfer of a second data structure including at least one measured sample of each of two or more measured parameters.

20. A storage medium as defined in claim 12, wherein the bulk data transfer comprises a transfer of a second data structure including at least one measured sample of each of two or more measured parameters.

* * * * *